(12) United States Patent
Auquier et al.

(10) Patent No.: US 11,466,727 B2
(45) Date of Patent: Oct. 11, 2022

(54) BALL SOCKET ASSEMBLY, DUST BOOT THEREFOR AND METHOD OF CONSTRUCTION THEREOF

(71) Applicant: FEDERAL-MOGUL MOTORPARTS LLC, Southfield, MI (US)

(72) Inventors: Andrew L. Auquier, St. Charles, MO (US); James J. Elterman, Byrnes, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 108 days.

(21) Appl. No.: 16/566,665

(22) Filed: Sep. 10, 2019

(65) Prior Publication Data
US 2021/0071709 A1    Mar. 11, 2021

(51) Int. Cl.
| | | |
|---|---|---|
| *F16C 11/06* | (2006.01) | |
| *B62D 7/22* | (2006.01) | |
| *B60G 7/00* | (2006.01) | |

(52) U.S. Cl.
CPC .......... *F16C 11/0642* (2013.01); *B60G 7/005* (2013.01); *B60G 2204/416* (2013.01); *B62D 7/228* (2013.01)

(58) Field of Classification Search
CPC . F16C 11/0671; F16C 11/0666; F16C 11/068; F16C 11/0619; F16C 11/0614; F16C 11/0623; F16C 11/0642; Y10T 403/31; Y10T 403/315; Y10T 403/32196; Y10T 403/32311; Y10T 403/32631
See application file for complete search history.

(56) References Cited

U.S. PATENT DOCUMENTS

| | | | | |
|---|---|---|---|---|
| 3,248,955 | A | * | 5/1966 | Templeton ................. F16J 3/04 403/50 |
| 3,310,326 | A | * | 3/1967 | Melone .................... B62D 7/18 277/635 |
| 3,343,855 | A | | 9/1967 | Husen |
| 3,343,857 | A | | 9/1967 | Cislo |
| 3,403,932 | A | * | 10/1968 | Kutcher ................. F16C 11/06 403/51 |
| 3,650,004 | A | | 3/1972 | Bergstrom |
| 4,322,175 | A | * | 3/1982 | Szczesny ................ F16B 21/20 277/635 |

(Continued)

*Primary Examiner* — Daniel J Wiley
(74) *Attorney, Agent, or Firm* — Robert L. Stearns; Dickinson Wright, PLLC

(57) ABSTRACT

A ball socket assembly, dust boot assembly therefor, and method of construction thereof are provided. The ball socket assembly includes a housing with an inner bore extending along a central axis. A bearing is disposed in the inner bore. A ball portion of a ball stud is disposed in sliding engagement with the bearing and a shank portion extends outwardly from the housing. A dust boot assembly having a tubular wall extends along the central axis between a distal end disposed about the shank portion and a proximal end in sealed engagement with the housing. The dust boot proximal end has an annular flange extending radially outwardly from the central axis. The annular flange has a cylindrical outer surface, a lower surface and an upper shoulder. An annular metal ring is disposed about and substantially encapsulates the cylindrical outer surface, lower surface and upper shoulder of the annular flange.

18 Claims, 10 Drawing Sheets

(56) References Cited

U.S. PATENT DOCUMENTS

| | | | |
|---|---|---|---|
| 4,921,368 A * | 5/1990 | Busse | F16C 11/0671 |
| | | | 277/634 |
| 5,380,114 A | 1/1995 | Urbach | |
| 5,509,749 A | 4/1996 | Eifert et al. | |
| 5,529,420 A | 6/1996 | Henkel et al. | |
| 5,927,891 A | 7/1999 | Trumbower et al. | |
| 6,648,340 B2 * | 11/2003 | Yagyu | F16J 3/042 |
| | | | 277/634 |
| 7,261,487 B2 | 8/2007 | Urbach | |
| 7,980,564 B2 * | 7/2011 | Niwa | F16C 11/0671 |
| | | | 277/634 |
| 9,771,971 B1 * | 9/2017 | Winter | B60G 7/001 |
| 2005/0053420 A1 | 3/2005 | Blaszynski | |
| 2017/0146054 A1 | 5/2017 | Konno et al. | |

* cited by examiner

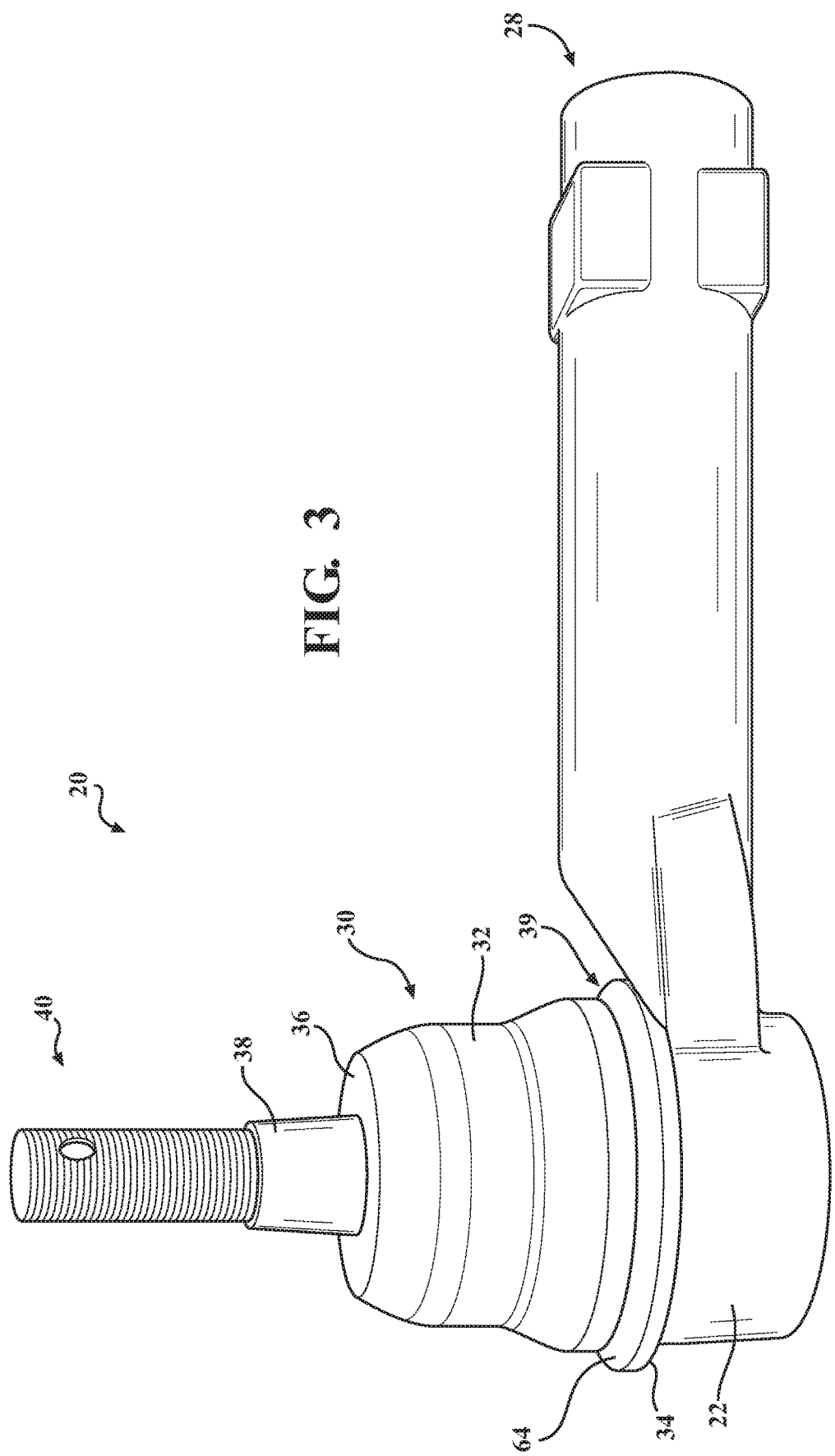

BALL SOCKET ASSEMBLY, DUST BOOT THEREFOR AND METHOD OF CONSTRUCTION THEREOF

BACKGROUND OF THE INVENTION

1. Field of the Invention

The present invention is related generally to movable joints, such as for use in a vehicle steering and/or suspension assembly, and more particularly to ball socket assemblies and dust boots therefor.

2. Related Art

Ball socket assemblies, also referred to as ball joints, are commonly employed in vehicle suspension and steering assemblies to allow two components (such as a tie rod and a knuckle, for example) to articulate, pivot and/or rotate relative to one another during operation of the vehicle. Such ball socket assemblies typically include a housing that is fixedly attached with one of the components and a ball stud that is fixedly attached with the other component. The ball stud typically has a ball portion that is received in an inner bore of the housing and a shank portion which projects out of the housing. At least one bearing is disposed in the housing and slidably supports the ball portion of the ball stud to allow the ball stud to rotate and articulate relative to the housing. A dust boot is typically disposed about the shank portion of the ball stud and fixed to the housing to establish seals with the shank portion and the housing. The dust boot functions to retain lubrication within the ball socket assembly, while also functioning to keep dust, debris and other forms of contamination out of the housing.

Known dust boots, although generally effective at performing there intended function, come with various drawbacks, whether real or perceived. For example, as shown in a ball socket assembly 1 of FIG. 1, an attachment end 2 of a dust boot 3 that is fixed to a ball socket housing 4 commonly has a metal annulus 5 configured to facilitate fixation of the dust boot 3 to the housing 4. Although the metal annulus 5 can prove useful in facilitating the attachment of the dust boot 3 to the housing 4, drawbacks remain. For example, as shown in FIG. 1, known metal annulus 5 commonly result in the formation of a non-uniform, wavy outer surface 6 of a flexible tubular wall (boot) 7 of the dust boot 3. The wavy outer surface 6 stems from regions of the boot 7 protruding radially outwardly, such as between circumferentially spaced retention teeth of the metal annulus 5. With an upper shoulder 9 of the boot 7 remaining exposed, the material (rubber) of the boot 7 is free to protrude upwardly under the force applied to the boot 7 during assembly. Accordingly, the outer surface 6 takes on an undulating, unsightly wavy appearance. Aside from being unsightly, which can cause a viewer to be concerned about the integrity of the dust boot 3, the seal provided between the dust boot 3 and the housing 4 could be compromised given the circumferentially non-uniform force existing between the boot 7 and the housing 4. This arises due to the ability regions of the boot 7 allowed to freely protrude to be brought into a reduced interference-fit with the housing 4 relative to the regions that are not allowed to protrude radially outwardly.

In FIG. 1A, another known construction of a ball socket assembly 1' is shown including an attachment end 2' of a dust boot 3' that is fixed to a ball socket housing 4'. The assembly 1' has a metal annulus 5' configured to facilitate fixation of the dust boot 3' to the housing 4', with retention teeth 8' of the metal annulus 5' shown disposed within an annular groove G machined into the housing 4'. Although the annular groove G can prove useful in facilitating the attachment of the dust boot 3' to the housing 4', it is costly to form the annular groove G. In addition, as with the ball socket assembly 1 discussed above, an upper shoulder 9' of the boot 7' remains exposed. The exposed upper shoulders 9, 9' of the boots 7, 7' can present assembly complications, such as by being exposed to damage while pressing the dust boot 3, 3' onto the housing and limiting the pressing force that can be applied to the dust boot 3, 3' during assembly.

Accordingly, although the above ball socket assemblies 1, 1' can prove effective in use, solutions to at least the aforementioned problems, whether real or perceived, are sought in order to provide a dust boot that is able to exhibit a long a useful life, be economical in manufacture and assembly, avoid becoming unsightly, such as caused during assembly, and provide the ball assembly with an aesthetically pleasing appearance to avoid being compromised and/or a perception of being compromised.

SUMMARY OF THE DISCLOSURE

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

It is an object of the present disclosure to provide a ball socket assembly that overcomes disadvantages of known ball socket assemblies.

It is a further object of the present disclosure to provide a method of constructing a ball socket assembly that overcomes disadvantages of known methods of constructing ball socket assemblies.

It is a further object of the present disclosure to provide a ball socket assembly that is economical in manufacture and assembly and that exhibits a long and useful life.

It is a further object of the present disclosure to provide a dust boot assembly for a ball socket assembly that overcomes disadvantages of known dust boots.

It is a further object of the present disclosure to provide a dust boot assembly for a ball socket assembly that is economical in manufacture and assembly and that exhibits a long and useful life.

It is a further object of the present disclosure to provide a dust boot assembly and method of assembly thereof for a ball socket assembly that is economical in manufacture and assembly, that is aesthetically pleasing and that exhibits a long and useful life.

In accordance with these objectives, as well as others, which will be appreciated by those possessing ordinary skill in the art of ball socket assemblies in view of the disclosure herein, the present disclosure is directed to providing a ball socket assembly and dust boot assembly therefor, for a motor vehicle and non-vehicle applications, and to methods of construction thereof.

In accordance with one aspect, the present disclosure is directed to a ball socket assembly which advances the art and improves upon currently known ball socket assemblies for motor vehicles and non-vehicle applications.

In accordance with another aspect, the present disclosure is directed to a dust boot assembly for a ball socket assembly which advances the art and improves upon currently known dust boots for motor vehicles and non-vehicle applications.

In accordance with yet another aspect, the present disclosure is directed to a method of construction of a ball socket assembly which advances the art and improves upon currently known methods of construction for ball socket assemblies for motor vehicles and non-vehicle applications.

In accordance with these and other objects, advantages, and aspects, a ball socket assembly is provided including a housing with an inner bore extending along a central axis between a first end region and an open second end region. A bearing is disposed in the inner bore of the housing and a ball portion of a ball stud is disposed in the inner bore in sliding engagement with the bearing. The ball stud has a shank portion extending outwardly from the housing through the open second end. The ball socket assembly includes a dust boot assembly having flexible, tubular wall extending along the central axis between a distal open end configured in sealed engagement about the shank portion and a proximal open end configured in sealed engagement with the open second end region of the housing. The proximal open end of the dust boot has an annular flange extending radially outwardly from the central axis to a cylindrical outer surface extending between a lower surface and an upper shoulder of the annular flange. The dust boot assembly further includes an annular metal ring disposed about the annular flange. The annular metal ring has a cylindrical wall extending along the cylindrical outer surface of the annular flange, a base extending radially inwardly from the cylindrical wall along the lower surface of the annular flange toward the central axis, and a lip extending radially inwardly from the cylindrical wall along the upper shoulder of the annular flange toward the central axis. Accordingly, the annular flange of the dust boot is encapsulated by the annular metal ring, thereby being prevented from being seen and from becoming unsightly upon completing assembly of the dust boot assembly to the housing.

In accordance with another aspect of the disclosure, the base of the annular metal ring can be provided having a plurality of teeth extending radially inwardly away from the cylindrical wall in circumferentially spaced relation from one another to free ends, with the teeth being configured in an interference fit about the open second end region of the housing.

In accordance with another aspect of the disclosure, the proximal open end of the flexible, tubular wall extends radially inwardly of the free ends of the teeth in radially aligned relation with the teeth.

In accordance with another aspect of the disclosure, the annular flange of the flexible, tubular wall is substantially encapsulated by the annular metal ring, thereby facilitating assembly and promoting a uniform, non-wavy outer appearance of the flexible, tubular wall.

In accordance with another aspect of the disclosure, the lip substantially covers the upper shoulder of the annular flange of the flexible, tubular wall to further facilitate assembly and promote a uniform, non-wavy outer appearance of the flexible, tubular wall.

In accordance with another aspect of the disclosure, a dust boot assembly for a ball socket assembly including a ball shank having a ball portion disposed in a housing for pivotal movement therein and shank portion extending outwardly from the housing is provided. The dust boot assembly includes a flexible, tubular wall extending along a central axis between a distal open end configured for sealed engagement about the shank portion and a proximal open end configured for sealed engagement with the housing. The proximal open end has an annular flange extending radially outwardly from the central axis to a cylindrical outer surface extending between a lower surface and an upper shoulder of the annular flange. An annular metal ring is disposed about the annular flange. The annular metal ring has a cylindrical wall extending along the cylindrical outer surface of the annular flange, a base extending radially inwardly from the cylindrical wall along the lower surface of the annular flange toward the central axis, and a lip extending radially inwardly from the cylindrical wall along the upper shoulder of the annular flange toward the central axis.

In accordance with another aspect of the disclosure, the base of the annular metal ring can be provided having a plurality of teeth extending radially inwardly away from the cylindrical wall in circumferentially spaced relation from one another to free ends, with the teeth being configured for an interference fit about a portion of the housing.

In accordance with another aspect of the disclosure, the proximal open end of the flexible, tubular wall can be provided to extend radially inwardly of the free ends of the teeth in radially aligned relation with the teeth, such that the teeth bias the proximal open end into a fixed, sealed fit about a portion of the housing.

In accordance with another aspect of the disclosure, the teeth can be provided to extend generally transversely to the central axis in a pre-use state prior to bringing the proximal open end into sealed engagement with the housing, thereby improving the economies of constructing of the dust boot assembly.

In accordance with another aspect of the disclosure, the teeth can be configured to deflect into oblique relation with the central axis in an in-use state upon bringing the proximal open end into sealed engagement with the housing.

In accordance with another aspect of the disclosure, the teeth can be configured to extend in oblique relation with the central axis in a pre-use state prior to bringing the proximal open end into sealed engagement with the housing.

In accordance with another aspect of the disclosure, the annular flange of the flexible, tubular wall can be substantially encapsulated by the annular metal ring, thereby facilitating assembly and the preventing the formation of a non-uniform, wavy outer surface on the flexible, tubular wall.

In accordance with another aspect of the disclosure, the lip can be provided to substantially cover the upper shoulder of the annular flange of the flexible, tubular wall.

In accordance with another aspect of the disclosure, the lip can be provided to overly at least a portion of the base of the annular metal ring, such that the lip is axially aligned, relative to the central axis, with the base.

In accordance with another aspect of the disclosure, the lip can be provided to extend generally transversely to the central axis to provide a pressing surface, thereby facilitating assembly.

In accordance with another aspect of the disclosure, a method of constructing a ball socket assembly is provided. The method includes providing a housing having an inner bore extending along a housing central axis between a first end region and an open second end region. Further, disposing a bearing into the inner bore. Further, providing a ball stud having a shank portion and a ball portion and disposing the ball portion into sliding engagement with the bearing in the inner bore with the shank portion extending outwardly from the housing through the open second end region. Then, capturing the ball portion against removal from the inner bore. Further yet, providing a dust boot assembly including a flexible, tubular wall extending along a dust boot central axis between a distal open end and a proximal open end, with the proximal open end having an annular flange extending radially outwardly from the dust boot central axis to a cylindrical outer surface extending between a lower surface and an upper shoulder of the annular flange. Further, providing the dust boot assembly including an annular metal ring disposed about the annular flange. The annular metal ring having a cylindrical wall extending along the cylindrical outer surface of the annular flange, a base extending radially inwardly from the cylindrical wall along the lower surface of the annular flange toward the dust boot central axis, and a lip extending radially inwardly from the cylindrical wall along the upper shoulder of the annular flange toward the dust boot central axis. Then, aligning the dust boot central axis with the housing central axis and applying a force on the lip of the annular metal ring and pressing the dust boot assembly to move axially along the housing central axis into fixed engagement with the open second end region of the housing.

In accordance with a further aspect, the method can further include orienting the lip of the annular metal ring to extend generally transversely to the housing central axis and applying the force to act generally transversely to a plane along which the lip extends.

BRIEF DESCRIPTION OF THE DRAWINGS

These and other objects, features and advantages of the invention will become more readily appreciated when considered in connection with the following description of the presently preferred embodiments, appended claims and accompanying drawings, in which:

FIG. 3 is a view similar to FIG. 1 of a ball socket assembly constructed in accordance with one aspect of the disclosure;

DESCRIPTION OF AN EXAMPLE EMBODIMENT

Figure 2:
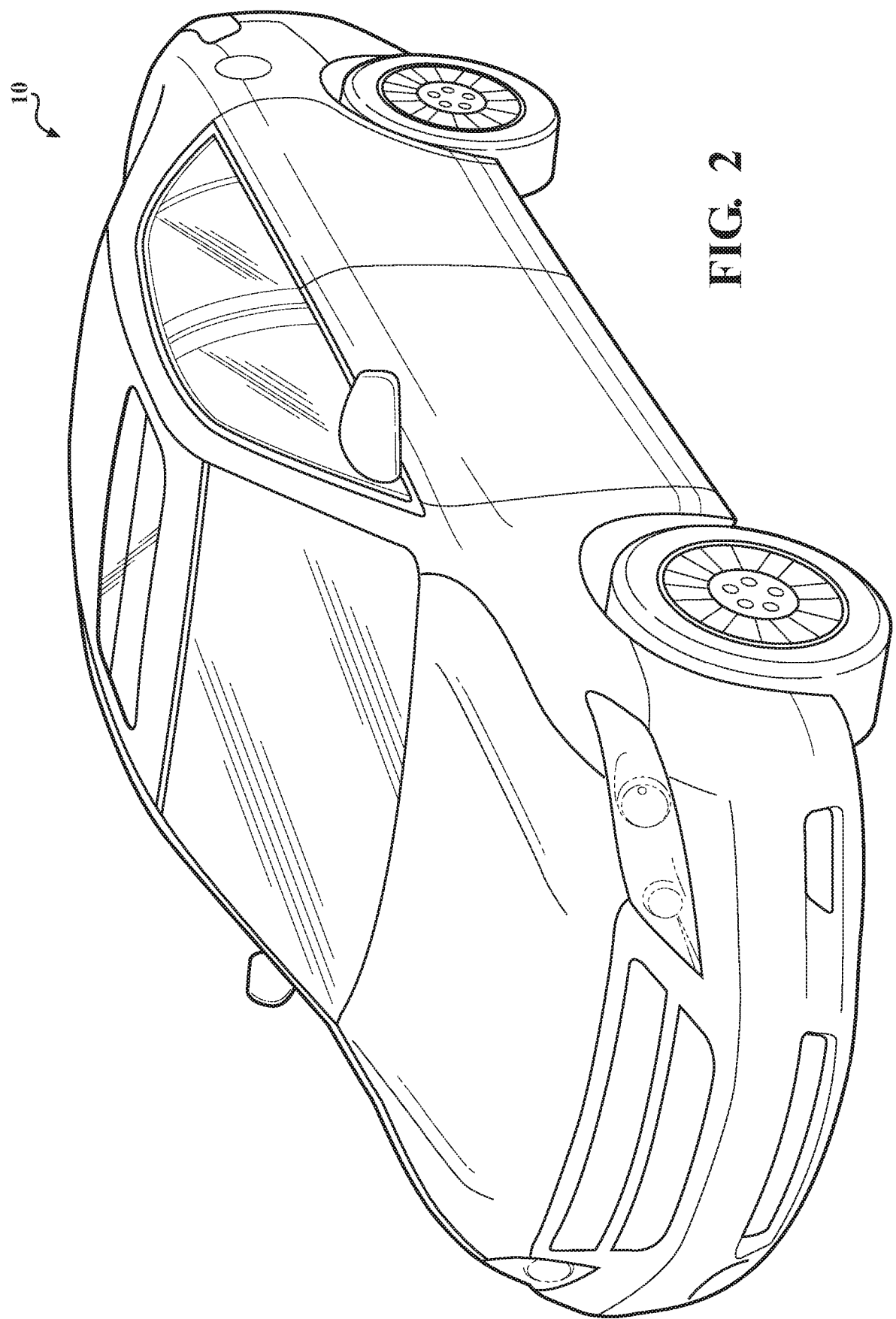
FIG. 2 is a perspective view of motor vehicle including one or more ball socket assemblies constructed in accordance with the disclosure.

Referring to the Figures, wherein like numerals indicate corresponding parts throughout the several views, unless otherwise stated, a motor vehicle 10 is shown in FIG. 2, wherein the motor vehicle 10 has at least one ball joint, also referred to as socket assembly or ball socket assembly 20 constructed in accordance with one aspect of the disclosure incorporated into a vehicle suspension and/or steering component thereof, such as in an inner and/or outer tie rod end and/or other steering and/or suspension applications of the motor vehicle, by way of example and without limitation. Of course, it is to be understood that the ball socket assembly 20 is well suited for use in other vehicle and non-vehicle applications. As explained in further detail hereafter, the ball socket assembly 20, components thereof and the methods of construction thereof overcome disadvantages of known ball socket assemblies, components thereof and methods of construction thereof, including those discussed above in the background, as will become readily understood by one possessing ordinary skill in the art of ball socket assemblies upon viewing the disclosure herein.

Figure 3A:
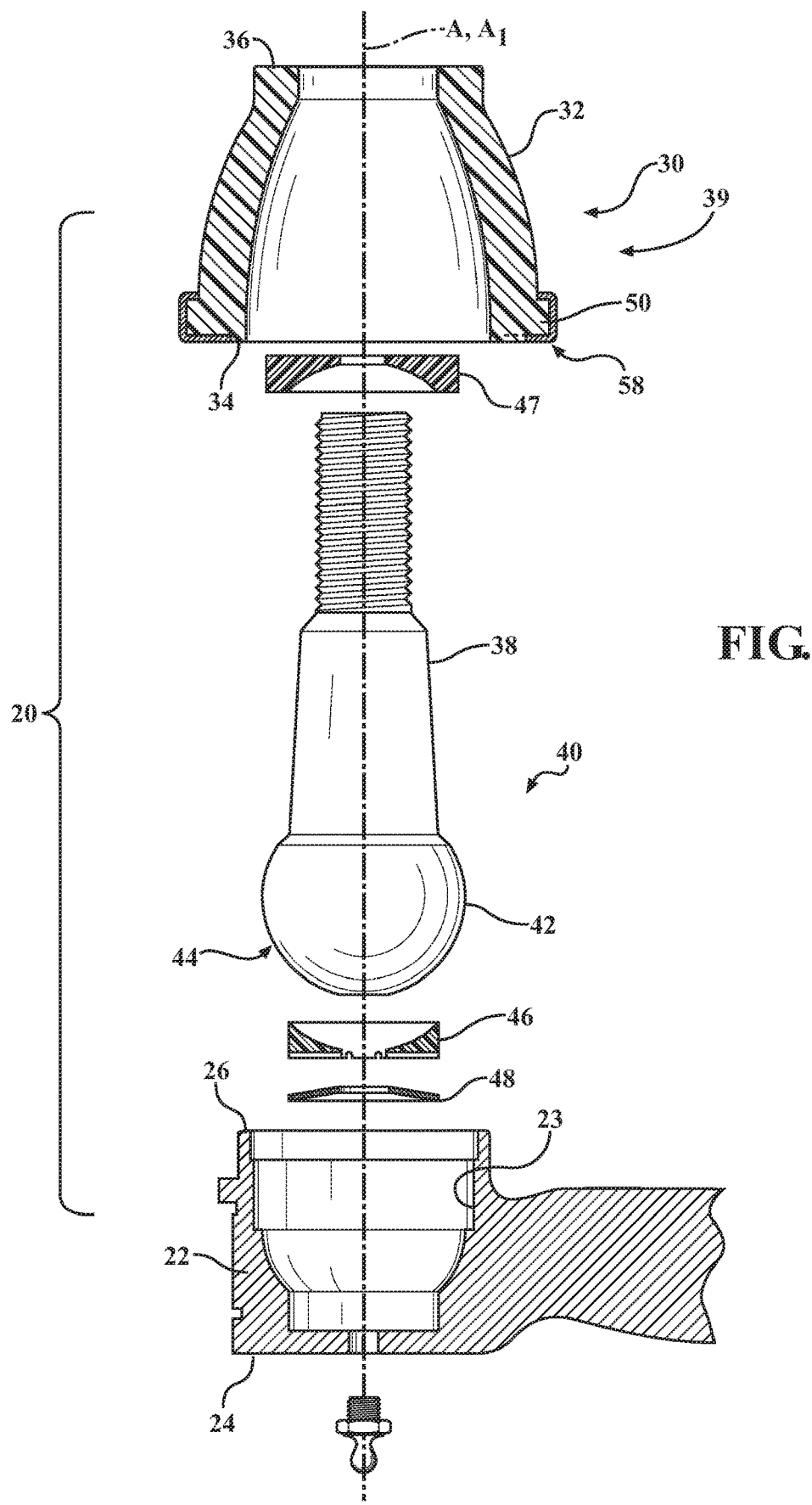
FIG. 3A is a partially cross-sectioned exploded view of a ball socket assembly constructed in accordance with the disclosure.
Figure 4:
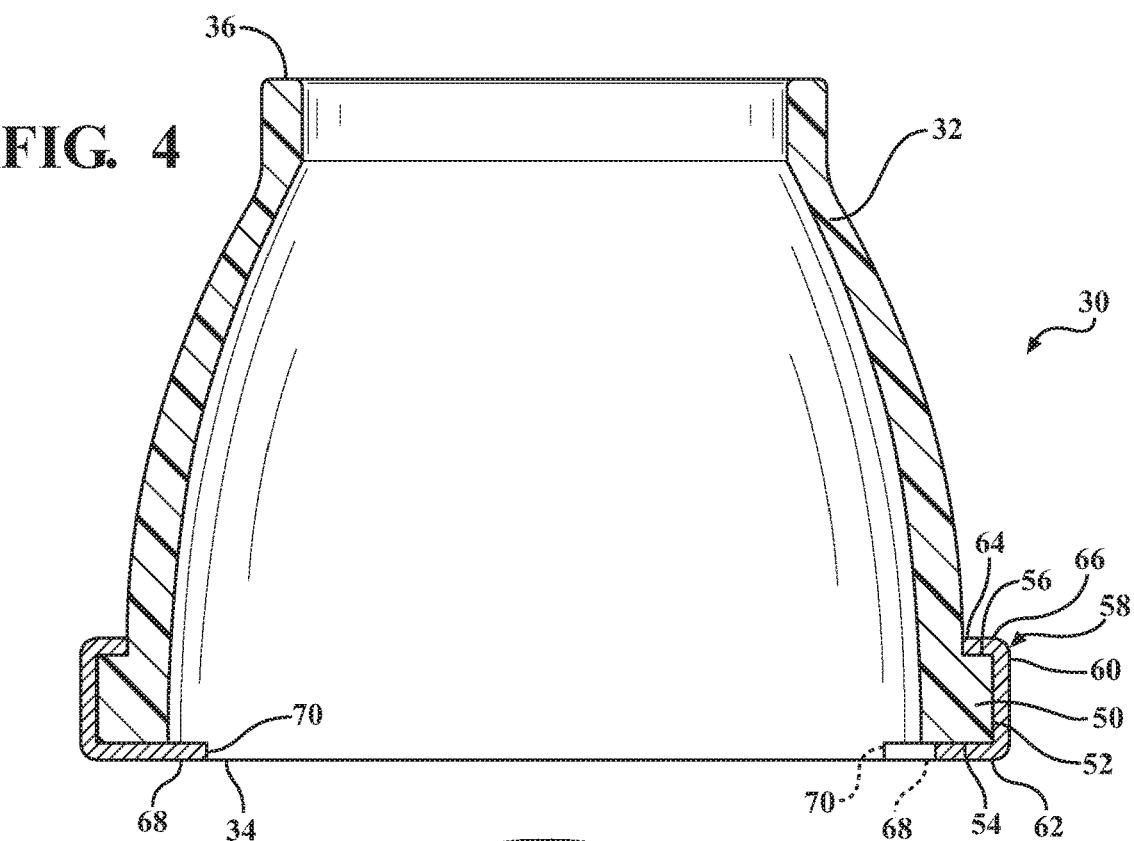
FIG. 4 is an enlarged cross-sectional view, taken along a central axis, of a dust boot assembly of the ball socket assembly of FIG. 3A.
Figure 4A:
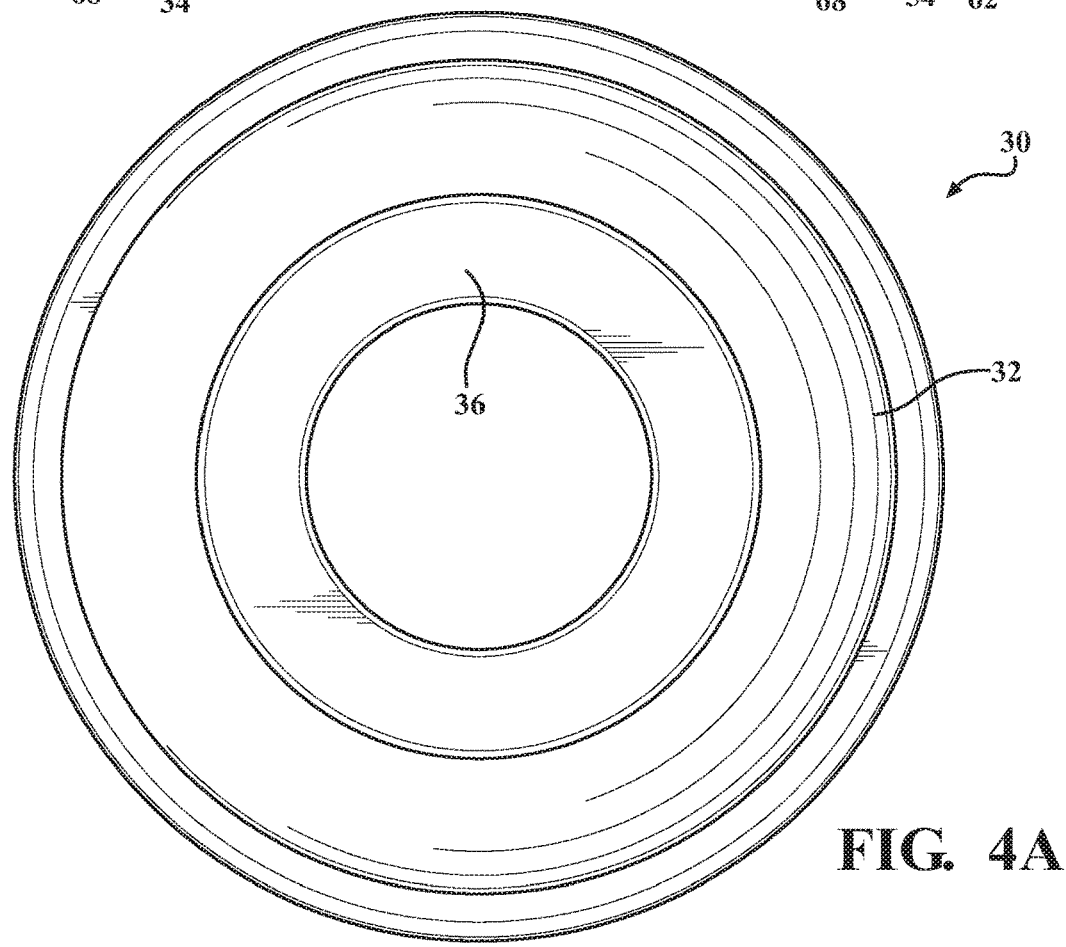
FIG. 4A is a top view of the dust boot assembly of FIG. 4.
Figure 4B:
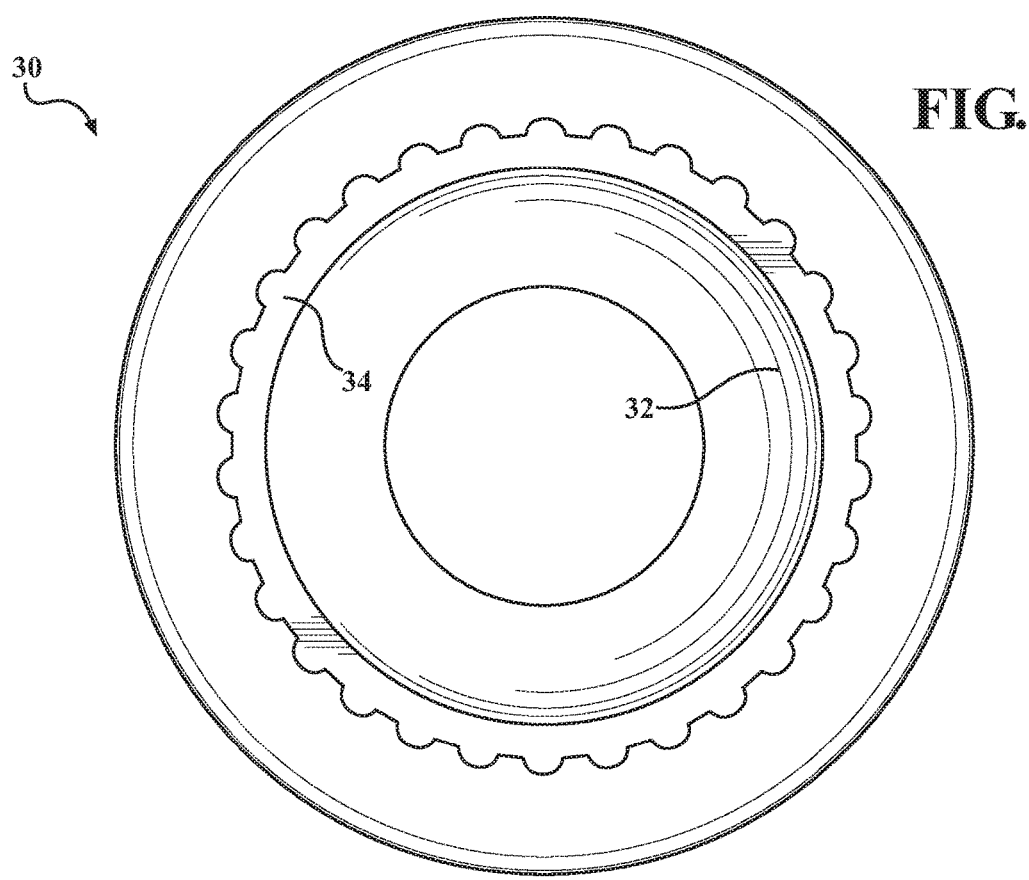
FIG. 4B is a bottom view of the dust boot assembly of FIG. 4.
Figure 4C:
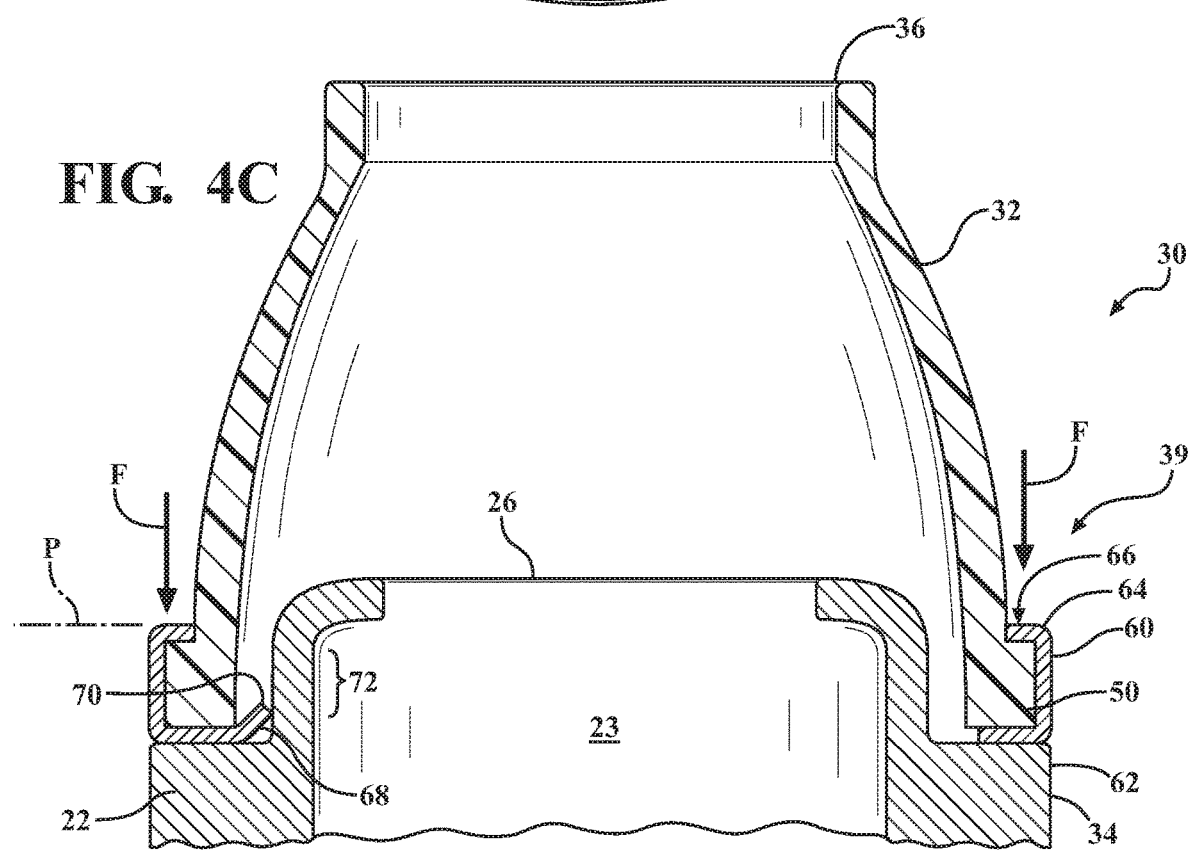
FIG. 4C is a view similar to FIG. 4 showing the dust boot assembly fixed to a housing of the ball socket assembly.

Now referring to FIGS. 3 and 4C, the ball socket assembly 20 includes a housing 22 having an inner bore 23 that extends along a housing central axis A from a closed first end 24 to an open second end 26. The housing 22 can be provided as a cartridge-style construction, having an outer surface, such as a cylindrical or partially cylindrical outer surface, which is designed to be press-fit into a similarly shaped opening of another component, such as a control arm (not shown), by way of example and without limitation, or the housing 22 can include a fixation member, shown as a threaded receptacle 28, shown as extending transversely to the central axis A from the closed first end 24, wherein the threaded receptacle 28 can be configured for attachment to a steering member, such as a tie rod, or otherwise. The housing 22 is preferably made as a single piece of metal, such as steel or an alloy steel, and may be formed through any suitable process or combination of processes, including casting, forging, and machining. The ball socket assembly 20 includes a dust boot assembly 30 having flexible, circumferentially continuous, tubular wall, also referred to as dust boot 32, extending along a dust boot central axis A1, shown as being coaxial with the housing central axis A, between a proximal open end, also referred to as first end 34, and a distal open end, also referred to as second end 36. The first end 34 is configured in sealed engagement with the open second end region 26 of the housing 22, while the second end 36 is configured in sealed engagement about a shank portion 38 of a ball stud 40. The dust boot assembly 30, and particularly the dust boot 32, has a uniform, smooth, non-undulating and aesthetically pleasing appearance thereover, including in an attachment region 39 that is configured for attachment to the open second end region 26 of the housing 22 without the need for providing a machined or otherwise formed outer annular groove in an exterior surface of the open second end region 26, thereby lending to the perception and reality of the dust boot assembly 30 providing a tight, reliable seal about the shank portion 38 as well as the open second end region 26 of the housing 22, and further resulting in a cost effective design via reducing the number of processes needed to manufacture the ball socket assembly 20.

The ball stud 40 includes the shank portion 38 and a ball portion 42, wherein the shank portion 38 extends from the ball portion 42. The ball portion 42 is disposed in the inner bore 23 of the housing 22, and the shank portion 38 extends out of the inner bore 23 through the open second end 26 of the housing 22. The ball portion 42, as is known, has a spherically contoured outer surface 44 configured for smooth, sliding engagement with a lower bearing 46 and upper bearing 47. The ball stud 40 is preferably made as a monolithic piece of metal, such as steel or an alloy steel, and may be formed through any suitable process or combination of processes, e.g., casting, forging, machining, etc.

The lower bearing 46 is shown, by way of example and without limitation, as being disposed in the inner bore 23 between the first end 24 of housing 22 and the ball portion 42 of the ball stud 28 to provide a low friction surface against which the ball stud 40 can rotate and articulate. The upper bearing 47 is shown, by way of example and without limitation, as being disposed in the inner bore 23 between the second end 26 of housing 22 and the ball portion 42 of the ball stud 28 to provide a low friction surface against which the ball stud 40 can rotate and articulate. The bearings 46, 47 can each be constructed as a single, monolithic piece of material, such as a highly wear resistant fiber-reinforced material, such as polyoxymethylene (also known as acetal), by way of example and without limitation. It is contemplated herein that a plurality of bearings could be used and oriented as desired.

During assembly, an elastic member, also referred to as preload member 48, which is constructed of a resilient compressible material, is disposed in the inner bore 23 of the housing 22 between the closed first end 24 of the housing 22 and the lower bearing 46 for imparting an axially directed biasing force along central axis A on the bearing 46 in a direction towards the open second end 26 of the housing 22. As such, the preload member 48 preloads the bearing surface of the bearing 46 against the spherically contoured outer surface 44 of the ball portion 42 of the ball stud 40 to provide the ball socket assembly 20 with a desirable torque to facilitate the desired articulation of the ball stud 40 and the desired rotational resistance of the ball portion 42 to obtain a smooth feel and ride of the suspension components of the motor vehicle 10. The preload member 48 is made of a resiliently compressible material and may be shaped through any suitable process including, for example, injection molding.

Upon disposing the preload member 48, lower bearing 46 and ball portion 42 of ball stud 40 into the inner bore 23, the upper bearing 47 is disposed about the shank portion 38 and into the inner bore 23 to bring the bearing surface of upper bearing 47 into engagement with an upper portion of ball portion 42, whereupon the open second end 26 of the housing 22 can then be plastically deformed (shown in FIG. 4C; such as in a crimping, rolling or swaging process, by way of example and without limitation) in a radially inward direction to capture the preload member 48, lower bearing 46, upper bearing 47, and ball portion 42 within the inner bore 23. Deforming the housing 22 urges the lower bearing 46 axially downwardly along the central axis A against the preload member 48 to axially compress and bias the preload member 48, as desired, to impart the intended preload between ball portion 42, lower bearing 46, and upper bearing 47. Due to the compressible, resilient nature of the preload member 48, as the lower bearing 46, upper bearing 47 and ball portion 42 wear during the operating life of the ball socket assembly 20, the preload member 48 can maintain a suitable reaction bias on the lower bearing 46 to maintain the desired surface-to-surface contact between the curved bearing surfaces of the lower bearing 46, upper bearing 47 and the outer surface 44 of the ball portion 42 of the ball stud 40.

Figure 1:
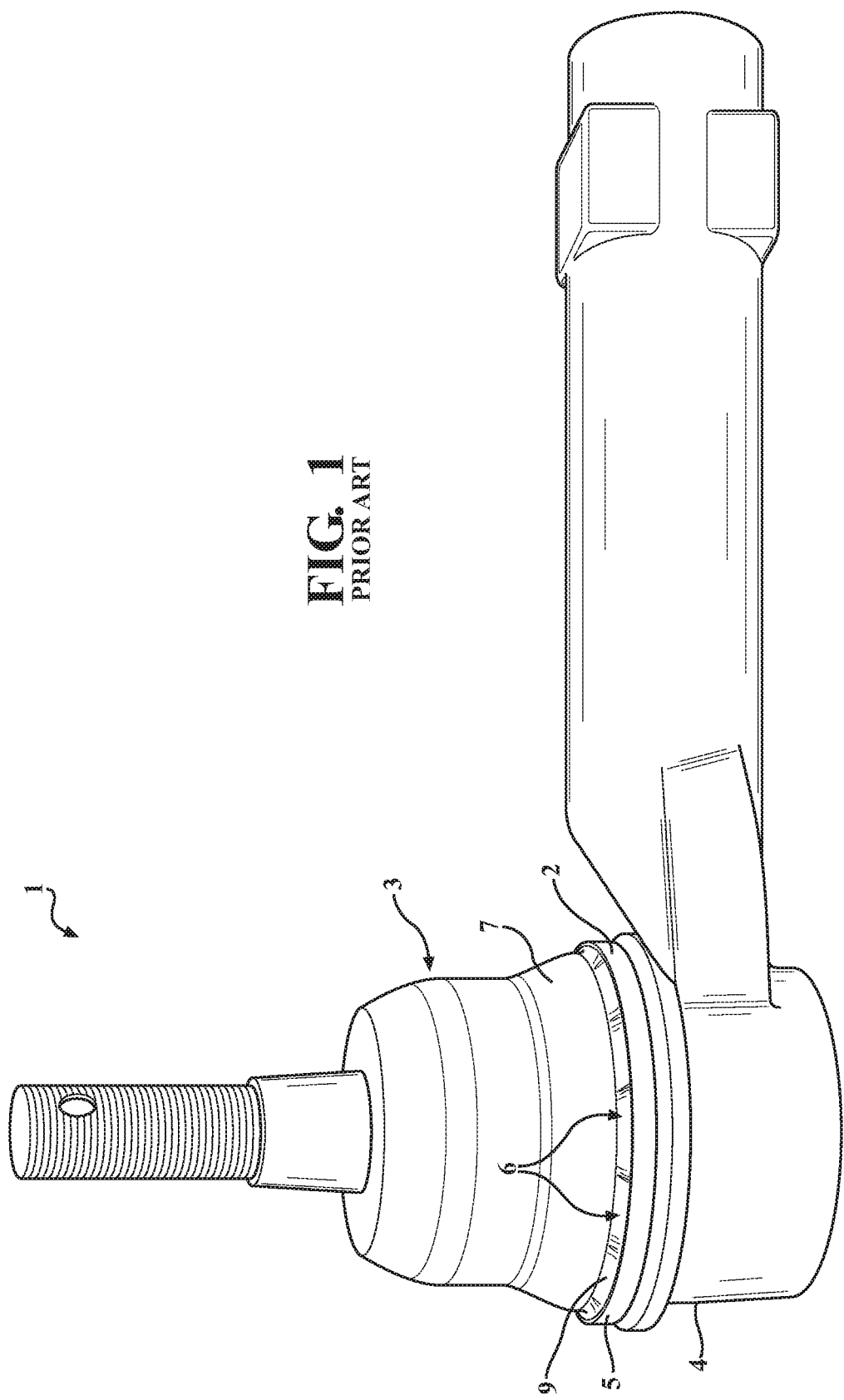
FIG. 1 is a perspective side view of a prior art ball socket assembly.
Figure 1A:
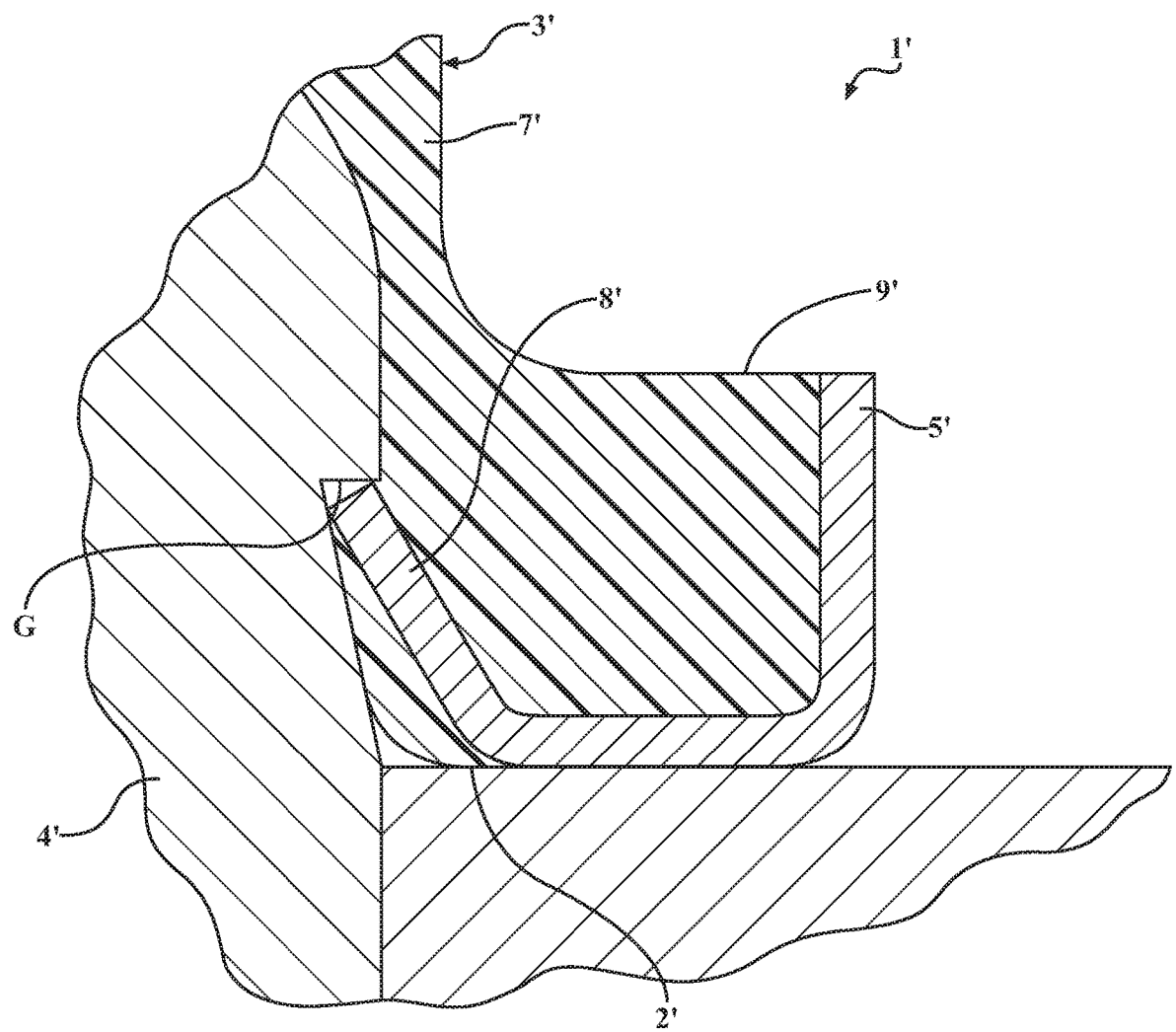
FIG. 1A is an enlarged fragmentary cross-sectional side view of another prior art ball socket assembly.

Upon capturing the ball portion 42 within the inner bore 23 of housing 22, such as discussed above, the dust boot assembly 30 can be disposed about the shank portion 38 of ball stud 40 to bring the distal open end 36 of tubular wall 32 into sealed engagement therewith, and the proximal open end 34 of tubular wall 32 can be attached to the open second end 26 of housing 22 in sealed relation therewith, without need for recessed features, such a machined annular groove, in an outer surface of the open second end 26 of housing 22. As best shown in FIG. 4, the proximal open end 34 has an annular flange 50 extending radially outwardly from the central axis A1 to a cylindrical outer surface 52 extending between a planar, or generally planar lower surface 54 and an upper surface, also referred to as upper shoulder or shoulder 56, of the annular flange 50. An annular metal ring 58 is disposed about the annular flange 50. The annular metal ring 58, as best identified in FIG. 4C, has a cylindrical wall 60 extending along the cylindrical outer surface 52 of the annular flange 50, a planar or substantially planar base 62 (substantially meaning the base 62 may not be perfectly planar, as will be understood by a person possessing ordinary skill in the art) extending radially inwardly from the cylindrical wall 60 along the lower surface 54 of the annular flange 50 toward the central axis A1, and a planar or substantially planar lip 64 (substantially meaning the lip 64 may not be perfectly planar, as will be understood by a person possessing ordinary skill in the art) extending radially inwardly from the cylindrical wall 60 along the upper shoulder 56 of the annular flange 50 toward the central axis A1 to overly at least a portion of the base 62 of the annular metal ring 58, such that the lip 64 is axially aligned, relative to the central axis A1, with the base 62. As such, the annular flange 50 of the flexible, tubular wall 32 can be entirely covered and encapsulated or substantially covered and encapsulated (substantially meaning a radially inner most region of the annular flange 50 may remain exposed, but the majority of the annular flange 50 is encapsulated) by the annular metal ring 58, thereby facilitating assembly by presenting a pressing surface 66 with the annular lip 64 against which a pressing force F can be applied in generally transverse relation to a plane P of the lip 64, and preventing the formation of a non-uniform, wavy or undulating outer surface on the flexible, tubular wall, such as shown in FIGS. 1 and 1A of the prior art.

In accordance with another aspect of the disclosure, as best shown in FIGS. 4-4C, the base of the annular metal ring 58 can be provided having a plurality of teeth 68 extending radially inwardly away from the cylindrical wall 60. The teeth 68 can be formed to extend in circumferentially spaced relation from one another to free ends 70, with the teeth 68 being configured for an interference fit about a cylindrical portion 72 of the housing 22. Accordingly, an inner diameter of the teeth 68 can be less than an outer diameter of the cylindrical portion 72 of the housing 22. Further yet, the proximal open end 34 of the flexible, tubular wall 32 can be provided to extend radially inwardly of the free ends 70 of the teeth 68 in radially aligned relation with the teeth 68, such that the resilient teeth 68 bias the material of the tubular wall 32 proximal open end 34 into a fixed, sealed fit about the cylindrical portion 72 of the housing 22 without need for recessed features, such a machined annular groove, in an outer surface of the open second end 26 of housing 22.

As shown in FIG. 4, the teeth 68 can be provided to extend generally transversely to the central axis A1 in a pre-use state prior to bringing the proximal open end 34 into sealed engagement with the housing 22, thereby simplifying and improving the economies of constructing of the dust boot assembly 30. As discussed above and as shown in FIG. 4C, the teeth 68 can be configured to deflect resiliently into oblique relation with the central axis A1 in an in-use state upon bringing the proximal open end 34 into sealed engagement with the housing 22.

Figure 5:
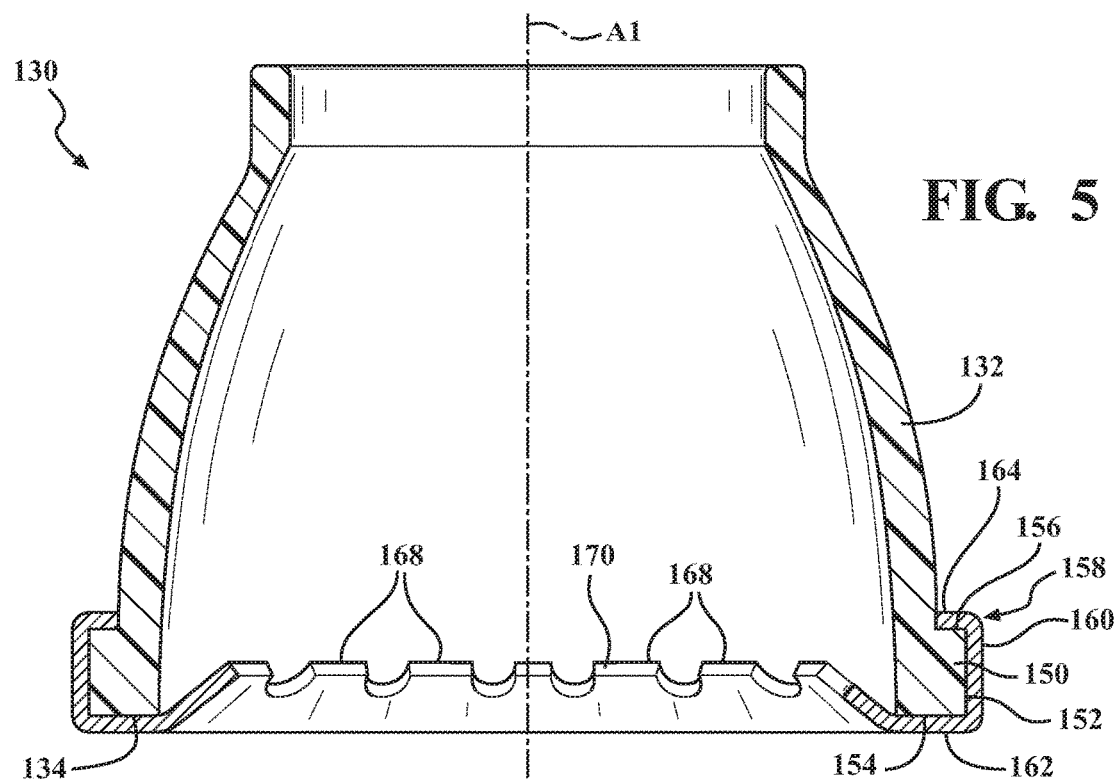
FIG. 5 is a cross-sectional view taken along a central axis of a dust boot assembly of a ball socket assembly constructed according to another aspect of the disclosure.
Figure 5A:
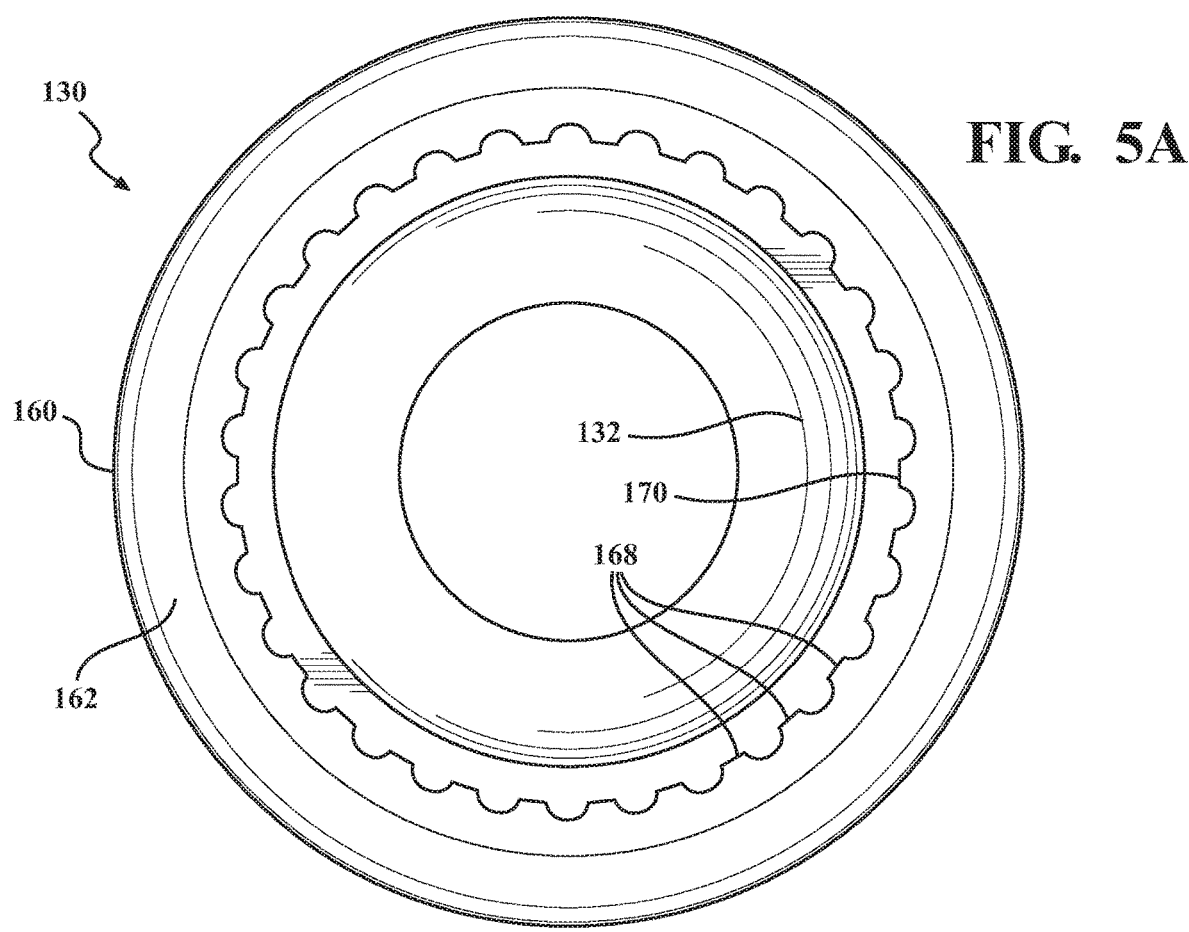
FIG. 5A is a bottom view of the dust boot assembly of FIG. 5.
Figure 5B:
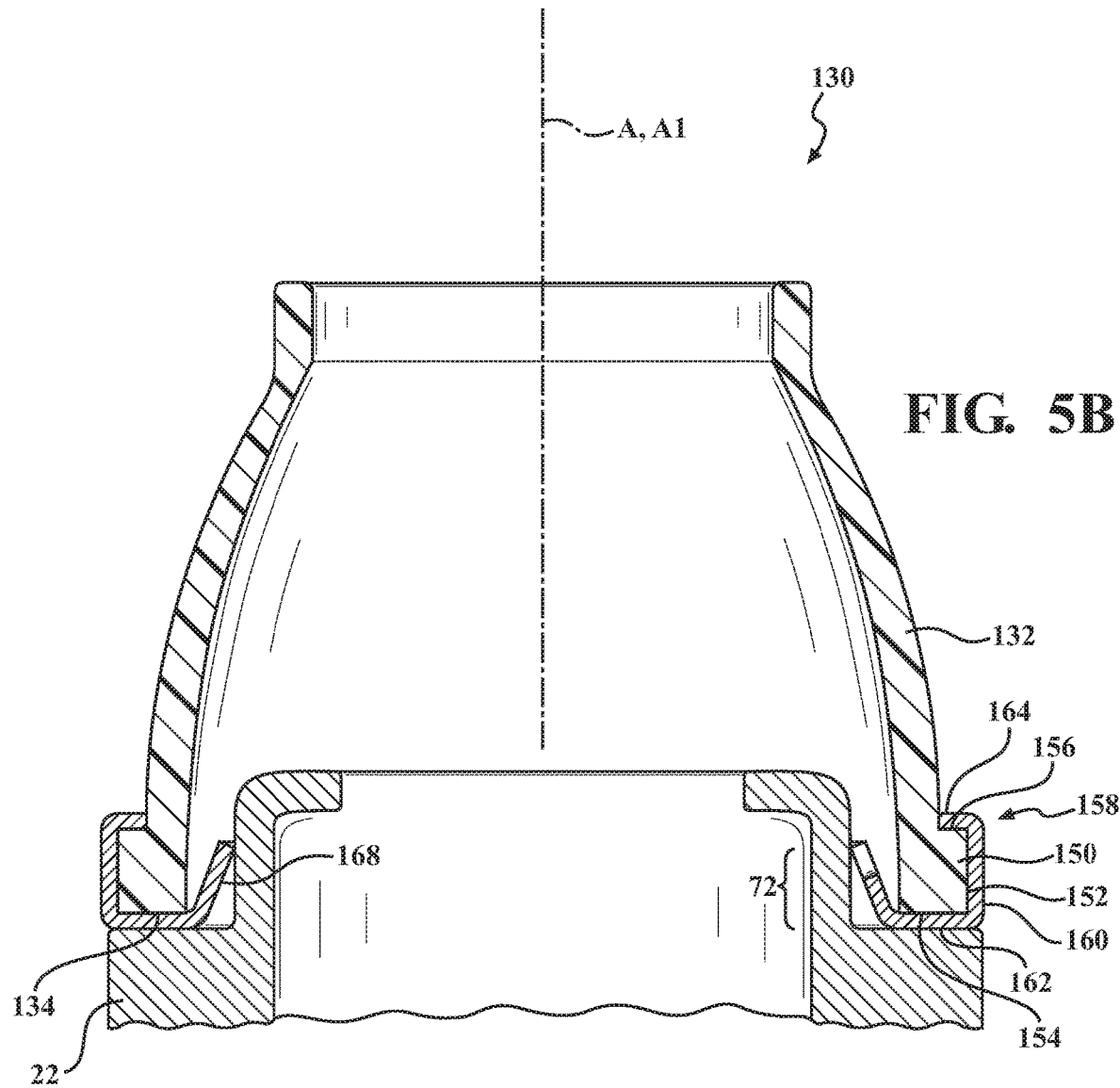
FIG. 5B is a view similar to FIG. 5 showing the dust boot assembly fixed to a housing of the ball socket assembly.

In FIGS. 5-5C, a dust boot assembly 130 constructed in accordance with another aspect of the disclosure is shown, wherein the same reference numerals, offset by a factor of 100, are used to identify like features. The dust boot assembly 130 is similar to dust boot assembly 30, including a tubular wall 132 extending between a proximal open end 134 having an annular flange 150 extending radially outwardly from a central axis A1 to a cylindrical outer surface 152 extending between a planar, or substantially planar lower surface 154 and an upper shoulder 156. An annular metal ring 158 is disposed about the annular flange 150. The annular metal ring 158 has a cylindrical wall 160, a planar or substantially planar base 162 extending radially inwardly from the cylindrical wall 160 toward the central axis A1, and a lip 164 extending radially inwardly from the cylindrical wall 160 toward the central axis A1 to overly at least a portion of the base 162. As such, as discussed above for annular flange 50, the annular flange 150 can be entirely covered and encapsulated or substantially covered and encapsulated by the annular metal ring 158. Further, the annular metal ring 158 can be provided having a plurality of teeth 168 extending radially inwardly away from the cylindrical wall 160. The teeth 168 can be formed to extend in circumferentially spaced relation from one another to free ends 170, with the teeth 168 being configured for an interference fit about a cylindrical portion 72 of the housing 22. However, unlike the teeth 68 discussed above, the teeth 168 can be provided to extend in oblique relation with the central axis A1 in a pre-use state prior to bringing the proximal open end 134 into sealed engagement with the housing 22. Otherwise, dust boot assembly 130 is generally the same as discussed above for dust boot assembly 30, and thus, further discussion is believed unnecessary, as one possessing ordinary skill in the art will readily understand the similarities in view of the disclosure herein.

Figure 6:
FIG. 6 is a flow diagram illustrating a method of constructing a ball socket assembly in accordance with another aspect of the disclosure.

In accordance with a further aspect of the disclosure, as shown diagrammatically in FIG. 6, a method of constructing the ball socket assembly 30, 130 is provided, as shown generally at 1000. The method 1000 generally includes a step 1100 of providing a housing 22 having an inner bore 23 extending along a housing central axis A between a first end region 24 and an open second end region 26. Further, at a step 1200, disposing a bearing 46 into the inner bore 23. Further, at a step 1300, providing a ball stud 40 having a shank portion 38 and a ball portion 42 and disposing the ball portion 42 into sliding engagement with the bearing 46 in the inner bore 23 with the shank portion 38 extending outwardly from the housing 22 through the open second end region 26. Then, at a step 1400, capturing the ball portion 42 against removal from the inner bore 23. Further yet, at a step 1500, providing a dust boot assembly 30, 130 including a flexible, tubular wall 32, 132 extending along a dust boot central axis A1 between a distal open end 36, 136 and a proximal open end 34, 134 with the proximal open end 34, 134 having an annular flange 50, 150 extending radially outwardly from the dust boot central axis A1 to a cylindrical outer surface 52, 152 extending between a lower surface 54, 154 and an upper shoulder 56, 156 of the annular flange 50, 150. Further, at a step 1600, providing the dust boot assembly 30, 130 including an annular metal ring 58, 158 disposed about the annular flange 50, 150. The annular metal ring 58, 158 having a cylindrical wall 60, 160 extending along the cylindrical outer surface 52, 152 of the annular flange 50, 150, a base 62, 162 extending radially inwardly from the cylindrical wall 60, 160 along the lower surface 54, 154 of the annular flange 50, 150 toward the dust boot central axis A1, and a lip 64, 164 extending radially inwardly from the cylindrical wall 60, 160 along the upper shoulder 56, 156 of the annular flange 50, 150 toward the dust boot central axis A1. Then, at a step 1700, aligning the dust boot central axis A1 with the housing central axis A and, at a step 1800, applying a force F on the lip 64, 164 of the annular metal ring 58, 158 and pressing the dust boot assembly 30, 130 to move axially along the housing central axis A into fixed engagement with the open second end region 26 of the housing 22.

In accordance with a further aspect, the method can further include orienting the lip 64, 164 of the annular metal ring 58, 158 to extend generally transversely to the housing central axis A and applying the force F to act generally transversely to a plane P along which the lip 64, 164 extends.

Obviously, many modifications and variations of the present invention are possible in light of the above teachings. It is to be understood that although the ball socket assembly 20 is depicted in a suspension/steering application of the motor vehicle 10, other applications within the motor vehicle 10 are contemplated herein, as well as other non-vehicular applications. Further yet, it is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A dust boot assembly for a ball socket assembly including a ball shank having a ball portion disposed in a housing for pivotal movement therein and shank portion extending outwardly from the housing, said dust boot, comprising:
    a flexible, tubular wall extending along a central axis between a distal open end configured for sealed engagement about the shank portion and a proximal open end configured for sealed engagement with the housing, said proximal open end having an annular flange extending radially outwardly from said central axis to a cylindrical outer surface extending between a lower surface and an upper shoulder of said annular flange;
    an annular metal ring disposed about said annular flange, said annular metal ring having a cylindrical wall extending along said cylindrical outer surface of said annular flange, a stopping base extending radially inwardly from said cylindrical wall along said lower surface of said annular flange toward said central axis and being configured to engage a surface on the housing of the ball socket assembly to establish a stopping point when installing said dust boot assembly on the housing, and a pressing lip extending radially inwardly from said cylindrical wall along said upper shoulder of said annular flange toward said central axis; and
    said stopping base of said annular ring having a plurality of teeth extending radially inwardly away from said cylindrical wall in circumferentially spaced relation with one another to free ends, said teeth being configured for an interference fit about a portion of the housing, the teeth all having equal lengths.

2. The dust boot assembly of claim 1, wherein said proximal open end of said flexible, tubular wall extends radially inwardly of said free ends of said teeth to cover said free ends of said teeth such that said teeth are not able to directly contact the housing.

3. The dust boot assembly of claim 1, wherein said teeth extend generally transversely to said central axis in a pre-use state prior to bringing said proximal open end into sealed engagement with the housing.

4. The dust boot assembly of claim 3, wherein said teeth are configured to deflect into oblique relation with said central axis in an in-use state upon bringing said proximal open end into sealed engagement with the housing.

5. The dust boot assembly of claim 1, wherein said teeth extend in oblique relation with said central axis in a pre-use state prior to bringing said proximal open end into sealed engagement with the housing.

6. The dust boot assembly of claim 1, wherein said annular flange of said flexible, tubular wall is substantially encapsulated by said annular metal ring.

7. The dust boot assembly of claim 1, wherein said pressing lip substantially covers said upper shoulder of said annular flange of said flexible, tubular wall.

8. The dust boot assembly of claim 1, wherein said pressing lip overlies at least a portion of said stopping base of said annular metal ring, such that said Dressing lip is axially aligned, relative to said central axis, with said stopping base.

9. The dust boot assembly of claim 1, wherein said pressing lip extends generally transversely to said central axis.

10. A ball joint assembly, comprising:
a housing with an inner bore extending along a central axis between a first end region and an open second end region, said housing having a cylindrical outer surface that extends to a stopping shoulder in said open second end region;
a bearing disposed in said inner bore of said housing;
a ball stud having a ball portion disposed in said inner bore in sliding engagement with said bearing and having a shank portion extending outwardly from the housing through the open second end;
a dust boot assembly including a flexible, tubular wall extending along said central axis between a distal open end configured in sealed engagement about said shank portion and a proximal open end configured in sealed engagement with said cylindrical outer surface of said open second end region of said housing, said proximal open end having an annular flange extending radially outwardly from said central axis to a cylindrical outer surface extending between a lower surface and an upper shoulder of said annular flange; and
said dust boot assembly including an annular metal ring disposed about said annular flange, said annular metal ring having a cylindrical wall extending along said cylindrical outer surface of said annular flange, a stopping base extending radially inwardly from said cylindrical wall along said lower surface of said annular flange toward said central axis and directly contacting said stopping shoulder of said housing, and a pressing lip extending radially inwardly from said cylindrical wall along said upper shoulder of said annular flange toward said central axis.

11. The ball joint assembly of claim 10, wherein said stopping base of said annular metal ring has a plurality of teeth extending radially inwardly away from said cylindrical wall in circumferentially spaced relation from one another to free ends, said teeth being configured for an interference fit about said open second end region of said housing, and said teeth all having equal lengths.

12. The ball joint assembly of claim 11, wherein said proximal open end of said flexible, tubular wall extends radially inwardly of said free ends of said teeth to cover said free ends of said teeth such that said teeth do not directly contact said housing.

13. The ball joint assembly of claim 10, wherein said annular flange of said flexible, tubular wall is substantially encapsulated by said annular metal ring.

14. The ball joint assembly of claim 10, wherein said pressing lip substantially covers said upper shoulder of said annular flange of said flexible, tubular wall.

15. The ball joint assembly of claim 10, wherein said pressing lip overlies at least a portion of said stopping base of said annular metal ring in axially aligned relation with said stopping base.

16. The ball joint assembly of claim 10, wherein said pressing lip extends generally transversely to said central axis.

17. A method of constructing a ball socket assembly, comprising:
providing a housing having an inner bore extending along a housing central axis between a first end region and an open second end region;
disposing a bearing into the inner bore;
providing a ball stud having a shank portion and a ball portion;
disposing the ball portion into sliding engagement with the bearing in the inner bore with the shank portion extending outwardly from the housing through the open second end region;
capturing the ball portion against removal from the inner bore;
providing a dust boot assembly including a flexible, tubular wall extending along a dust boot central axis between a distal open end and a proximal open end, the proximal open end having an annular flange extending radially outwardly from the dust boot central axis to a cylindrical outer surface extending between a lower surface and an upper shoulder of the annular flange, and further including an annular metal ring disposed about the annular flange, the annular metal ring having a cylindrical wall extending along the cylindrical outer surface of the annular flange, a base extending radially inwardly from the cylindrical wall along the lower surface of the annular flange toward the dust boot central axis, and a lip extending radially inwardly from the cylindrical wall along the upper shoulder of the annular flange toward the dust boot central axis;
aligning the dust boot central axis with the housing central axis; and
applying a pressing force on only the lip of the annular metal ring to move the dust boot assembly axially along the housing central axis into fixed engagement with the open second end region of the housing.

18. The method of claim 17, further including orienting the lip of the annular metal ring to extend generally transversely to the housing central axis and applying the force to act generally transversely to a plane along which the lip extends.

* * * * *